United States Patent
Heerklotz

(10) Patent No.: US 8,631,823 B2
(45) Date of Patent: Jan. 21, 2014

(54) MIXING FAUCET

(76) Inventor: Siegfried Heerklotz, Schledehausen (DE)

(*) Notice: Subject to any disclaimer, the term of this patent is extended or adjusted under 35 U.S.C. 154(b) by 619 days.

(21) Appl. No.: 12/748,400

(22) Filed: Mar. 27, 2010

(65) Prior Publication Data

US 2010/0180968 A1    Jul. 22, 2010

Related U.S. Application Data

(63) Continuation-in-part of application No. PCT/EP2008/008250, filed on Sep. 28, 2008.

(30) Foreign Application Priority Data

Sep. 27, 2007 (DE) .......................... 10 2007 046 135
Sep. 27, 2007 (DE) .......................... 10 2007 046 136

(51) Int. Cl.
    *F16K 11/02*      (2006.01)

(52) U.S. Cl.
    USPC ........................................................ 137/625.4

(58) Field of Classification Search
    USPC ................. 137/625.17, 625.4, 625.41, 637.3; 251/289
    See application file for complete search history.

(56) References Cited

U.S. PATENT DOCUMENTS

| | | | | |
|---|---|---|---|---|
| 2,601,966 A * | 7/1952 | Busick | ....................... | 137/625.13 |
| 2,633,872 A * | 4/1953 | Hennessey | ................. | 137/637.3 |
| 3,511,279 A * | 5/1970 | Hancock | .................... | 137/625.4 |
| 3,584,654 A * | 6/1971 | Deloye | ....................... | 137/637.2 |
| 3,667,503 A * | 6/1972 | Farrell et al. | ................ | 137/625.4 |
| 3,965,935 A * | 6/1976 | Morisseau | .................. | 137/625.4 |
| 4,033,373 A | 7/1977 | Manoogian et al. | | |
| 4,611,757 A * | 9/1986 | Saether | ....................... | 236/12.12 |
| 4,767,052 A | 8/1988 | Kostorz et al. | | |
| 5,070,906 A * | 12/1991 | Orlandi | ......................... | 137/606 |
| 6,491,063 B1 * | 12/2002 | Benatav | .................... | 137/625.43 |
| 6,854,658 B1 * | 2/2005 | Houghton et al. | ......... | 236/12.12 |
| 7,171,984 B2 * | 2/2007 | Pawelzik et al. | ............. | 137/606 |
| 7,607,449 B2 * | 10/2009 | Herring et al. | ............. | 137/15.18 |
| 2004/0016815 A1 | 1/2004 | Bergmann et al. | | |
| 2004/0060606 A1 | 4/2004 | Chen | | |
| 2005/0076960 A1 | 4/2005 | Luig et al. | | |
| 2005/0126643 A1 * | 6/2005 | Romero | ........................ | 137/606 |

FOREIGN PATENT DOCUMENTS

| | | |
|---|---|---|
| DE | 1198150 | 8/1965 |
| DE | 2324364 | 11/1973 |
| DE | 2724429 | 8/1977 |
| DE | 2636517 | 2/1978 |
| DE | 3118003 | 3/1982 |

(Continued)

*Primary Examiner* — John Fox
(74) *Attorney, Agent, or Firm* — Gudrun E. Huckett

(57) ABSTRACT

A compact and low-cost mixing faucet for liquids of different temperatures is proposed that allows fine and accurate adjustment of the volume and temperature of the mixed outflow by single-handed operation. The mixing faucet is suitable for use of a ceramic perforated plate and/or thermostatic mixing valve. The actuation quantities can be converted by torque converters to rotational control variables in an ergonomically optimum type, magnitude and/or positioning of movement, such that both rotational control variables can be selectively adjusted when manually operated by accessing from a permanent direction of access. The hand position enables actuation of the faucet with only two fingertips, with torque limitable up to any degree of smoothness and a large angle of rotation at the associated rotary actuator. The rotational control variable for the outflow volume can be made ergonomically easier to reach and adjust from the direction of access.

29 Claims, 7 Drawing Sheets

(56) References Cited

FOREIGN PATENT DOCUMENTS

| | | |
|---|---|---|
| DE | 3411447 | 10/1985 |
| DE | 10044684 | 3/2002 |
| DE | 10048041 | 5/2002 |
| DE | 10347819 | 5/2006 |
| EP | 0242680 | 10/1987 |
| GB | 1405375 | 9/1975 |
| GB | 2076127 | 11/1981 |
| GB | 2156495 | 10/1985 |
| WO | 99/02906 | 1/1999 |

\* cited by examiner

MIXING FAUCET

CROSS REFERENCE TO RELATED APPLICATIONS

This application is a continuation-in part application of international application PCT/EP2008/008250 having a filing date of 28 Sep. 2008, the disclosure of which is incorporated herein by reference in its entirety, and claims the benefit under 35 USC 119 of German patent applications 10 2007 046 136.6 filed 27 Sep. 2007 and 10 2007 046 135.8 filed 27 Sep. 2007, the contents of which are incorporated herein by reference in their entirety.

BACKGROUND OF THE INVENTION

The invention relates to a mixing faucet for two liquids of different temperatures that comprises a mixing valve, a perforated plate valve with an actuation quantity that determines the volume of an outflow, and at least one rotary actuator mounted in a rotary degree of freedom in relation to a fixed housing, wherein rotation of the at least one rotary actuator adjusts at least a first of two independent coaxial rotational control variables to control the volume or temperature of an outflow.

Mixing faucets with two rotary actuators are known, which adjust two incoming flows by means of one closing valve or one closing and mixing valve for each of the said flows, whose rotational axes include an angle between 60° and 120° or are spaced at a distance to one another. The disadvantage of these mixing faucets is that the quantity and temperature of the outflow can only be adjusted in combination by two gripping movements, whereby the two movements enable fine adjustability. This is achieved by single uniaxial rotary movements rotating through angles of up to more than 360°; this is known by experience as the best actuating movement because it is known to be most safely and confidently controllable.

Mixing faucets are also known with one actuator movable in two degrees of freedom.

DE1198150A and DE2724429A1 describe mixing faucets with an actuator that sets the quantity of outflow by a shift in the direction of the rotational axis and the size ratio of two inflows via a rotational movement of max. 150°. The disadvantage is the limited angle of rotation of 150°, which does not assure fine adjustability. The longitudinal movement is ergonomically even more unfavorable and gives only unsatisfactory results.

DE2636517A1 discloses an actuator with two degrees of freedom. A shift in the direction of the rotational axis switches to adjust either the quantitiy of the outflow or the size ratio of two inflows by rotating the single actuator by max. 180°. The to disclosed design requires two movements for a change of temperature, that is: firstly, the longitudinal movement to switch, then the rotational movement; this is not only cumbersome but also ergonomically implausible and thus unfavorable. Moreover, additional pulling or pushing force is applied during the rotational movement for one of the adjustments in order to maintain the adjusted setting, which makes handling more difficult. Thus, despite the single directly accessible actuator, only one variable is available in direct access. Fine and accurate adjustment is thus not possible due to the limited angle of rotation. The complex valve design with one closing and mixing valve for each inflow is delicate and costly, and the mixing valve is difficult to clean and replace. The entire valve construction is obsolete.

Lever mixer faucets are the most familiar type (for example DE3411447A1, DE2324364A), having a lever handle as the rotary tilting actuator with two degrees of freedom, in which the initial longitudinal movement of a piston valve that is also rotatable is converted into a vertical tilting movement of the lever to adjust the outflow quantity.

It is now state of the art to equip these lever mixing faucets with a ceramic perforated plate mixing valve, whereby the movable perforated plate is in direct rotational contact with the lever actuator. The temperature is adjusted by means of a rotational movement of the lever actuator via the size ratio of two inlet cross sections, and the outflow quantity is adjusted via the size of the inlet cross sections by means of a rotation-dependent tilting movement of the same lever actuator.

In these lever mixing faucets, only tilting angles of less than 30° and angles of rotation of less than 120° are feasible, which is ergonomically inadequate. The combination of two basically single rotational or tilting movements in the same actuator results in an unmanageable and barely controllable three-dimensional movement, which is not capable of intuitive regulation when operated only briefly. The adjustment movement has to be corrected subsequently and as experience shows, it has to be broken down into the two basic movements, although a successful, clear separation of the two is rare. It has become apparent that, for over 90% of people, the two basically independent variables, outflow quantity and temperature, are almost impossible to adjust accurately by means of a combined rotational and tilting movement. Inadvertent maladjustment, such as opening the faucet unintentionally, happens easily merely by knocking against the lever handle, which may even lead to scalding in the worst case.

It is known from DE10347819A1 to provide a mixing faucet without a mixing valve, the mixing faucet having two coaxial rotary actuators in succession. The required high torque can only be applied with levers, even if an intermediate gear is present. Each rotary actuator operates a closing valve for cold or hot water respectively. This does not permit a deliberate clear setting of the temperature or outflow quantity, as the temperature results from the relative angle of rotation of both rotary actuators. Nor are the directions of access either the same or consistent, so that genuine single handed operation (i.e. access with one hand) is ruled out. The angles of adjustment are extremely small due to reduction by the internal crown gear, and this is only slightly and inadequately compensated by the intermediate gear. At the same time, this system increases the differentials in the direction of access. Fine and accurate adjustment is impossible with this principle.

Thermostatic mixers (e.g. DE3118003A1, DE10044684A1, EP0242680A2) have two single-axis rotary actuators, which are widely spaced in an ergonomically unfavorable manner, with access from opposite directions, even though they permit 180° of rotation for the quantity and 360° for the temperature of the outflow. This necessitates two grasping movements and opposite rotational movements, thus ruling out comfortable single-handed operation.

Thermostatic mixers that are partially built into the wall (DE10048041A1) are provided with two coaxial rotary actuators arranged in succession, with a rotational angle of approximately 360° (for the temperature) and just under 90° (for outflow volume control), and can be adjusted from two directions of access lying at least close together. The front rotationally symmetrical rotary actuator for the temperature can be grasped and positioned at the end, the rear rotary actuator for the outflow volume works due to the high torque only via a radial lever, and this does not allow genuine single-handed operation. Both adjustment movements are achievable only by means of dual access, in which the direction of access to the lever changes during the adjustment movement in absolute and, above all, relative terms in relation to the direction of access of the front rotary actuator. Temperature adjustment is more obvious and easier than the adjustment of the outflow volume. This is ergonomically inadequate, as the volume adjustment at the start of the outflow has the highest priority when operating a mixing faucet. Moreover, the built-in thermostat is requires complex installation in the wall, hence is not suitable for the common and by far the most frequent use in visible applications as sink, shower and bath faucets.

An object of the invention is to create a mixing faucet that will allow selective, substantially direct, comfortable, and clear setting of the two target variables, i.e. temperature and quantity of outflow, substantially independently of each other whilst ruling out inadvertent actuation, for example by a mere knock, thus creating the conditions for genuine single-handed operation in a permanent direction of access, also of thermostatic mixers, using proven valve technology at little extra cost.

SUMMARY OF THE INVENTION

This problem is solved by the invention by means of a torque converter that is able to convert the type of movement, position and/or magnitude of the actuator quantity into the first rotational control variable on a plane that is in particular parallel to the sliding plane of the perforated plate valve. This torque converter is so efficient that it enables independent clear and sure setting of both rotational control variables smoothly and without lever reinforcement across the full range of adjustment, using only two fingertips on approximately opposite sides of the envelope surface of the rotary actuator in substantially only one position of the accessing hand.

In this embodiment of the mixing faucet, the simple and low-cost torque converter transforms, by means of conversion of movement, such as a displacement and/or deflection, a degree of freedom defined by the valve technology of the perforated plate valve controller into an ergonomically favorable adjustment movement for operation, and thus enables use of the said embodiment in various proven valve technologies such as perforated ceramic plate valves, thermostatically controlled valves—the design of which may need to be optimised if appropriate.

The torque converter not only opens up in principle a simple means of obtaining transmission ratios far in excess of 2, but also creates the conditions for setting the two target variables, temperature and outflow volume, independently of one another, deliberately and accurately in an ergonomically optimum position and manner of movement, with the optimum input of movement energy in the form of adjustment range and adjustment force. The pre-requisite for this is that the two adjustment movements are not coupled in any way.

The concept of the invention with one or more torque converters allows designs in which the ergonomically most simple and precise uniaxial rotary operating movement is realised for both rotational control variables independently of each other by applying two fingertips on approximately opposite sides of the outer envelope surface of the rotary actuator in an ergonomically favorable position. The rotary actuator is unlevered and substantially invariate in relation to its adjustment movements. Each rotary actuator has only one degree of freedom in relation to the stationary housing. Inadvertent operation is thus ruled out in principle.

Invariance allows access independently of the current angular position of the rotary actuator. This means that access requires no particular positioning of the hand. This is comfortable operation, as it is not necessary to recognize the current angular position of the rotary actuator or to adjust the positioning of the hand accordingly when accessing it, and is thus the precondition for the simple interchange between two rotary actuators. Invariance can be achieved by rotational symmetry to the axis of rotation. In the simplest case, this is a smooth cylinder with the rotational axis as the axis of symmetry.

Slight variations from rotational symmetry are advantageous for a secure grip between fingertips and outer envelope surface, for example polygonal shapes such as a round-cornered triangle or square, etc. The said variations from symmetry should, however, be limited in such a way that no special position or holding of the hand is required when accessing it, in order to avoid any impairment of the comfort of operation.

Alternatively, the outer envelope surface of the rotary actuators can be axially gnurled for a secure friction or form fit, or it may be provided with longitudinal ribs with a thickness of about 1 to 2 mm and a height of up to 3 mm, or grooves of 1 to 2 to mm in depth. They can be arranged such that the rotational symmetry of the actuators, hence their invariance in relation to rotation about their axis of rotation is substantially not or only negligibly limited for handling.

Furthermore, the invention enables two rotary actuators to be arranged in a design with the same direction of access such that the said rotary actuators can be operated selectively by moving only the fingers from just one position, after positioning the hand for access, this with extreme smoothness and ease. This forms the basis for clear and targeted true single-handed operation using only two fingertips, which is substantially different from known "single handed mixing faucets".

Furthermore, the more important adjustment—outflow volume—can be arranged to be reached more easily in the direction of access, and hence to take preference, this being ergonomically correct, so that the sum of all these advantages amounts to the highest ease of operation.

The use of a simple, flat torque converter, for instance made of injection molded plastic, keeps down the extra cost. The cost with a perforated plate mixing valve is comparable to that of lever type mixing faucets, the standard medium-range mixing faucets or, in the case of a thermostatic valve, with those of built in thermostats.

The invention enables a very compact, stable construction with both housing rotary actuator embodiments in thin stainless steel pipes, and cast brass or plastic.

The inventive combination of torque converters with leverless single-handed finger-operated rotary actuators opens up the way for a great diversity of artistically harmonious design alternatives.

In a further embodiment of the invention, the actuating movement, of the fingertips of the accessing hand can operate to switch to either of the control variables with no movement of the arm and no substantial displacement of the hand, resulting in the highest comfort of single-handed operation even when setting both rotational control variables in one action. This is of particular interest in equipping bathrooms for the elderly or sanitary facilities for people with handicaps.

The torque converter enables practically any limitable torque adjustment by converting an actuation quantity into the corresponding rotational control variable with a transmission ratio of 1.6 to over 4, thus determining and assuring the smoothness of a rotational control variable. At the same time, almost any size of positioning angle can be achieved up to well over 250°. The result is the greatest ergonomic comfort of operation combined with sensitive and accurate adjustment. The gearing effect of the torque converter can also be achieved or reinforced with an additional gear.

Shaping the torque converter in the general form of a circular disc and arranged in parallel spacing to the slip plane of the perforated plate valve, results in the most compact structure of a perfectly cylindrical shape, as the central axis of the torque converter can be selected to be identical to all the axes of rotation of the rotary actuators and rotational control variables.

The design is simplified if the axes of rotation of the rotational control variables and the associated actuators intersect each other or all, or in the simplest case, are identical. Further simplification results from arranging the axes of rotation of the rotational control variables normal to the slip plane of the perforated plates and hence to the plane in which the actuator quantities lie. This applies both when a rotary actuation quantity of the movable perforated plate is transformed (e.g. by a planetary gear) into a rotational control variable, and in the conversion of a translatory actuation quantity into a rotational control variable.

If the rotational control variables are uniaxial rotations whose axes of rotation are identical, in particular to the axis of rotation of the rotary actuator(s), the conditions are given for the simplest formal structure, i.e. in the basic form of a cylinder that is invariate with regard to the adjustment movements and has its direction of access to the end in the same direction as the axis of rotation.

For ergonomic reasons, but also by reason of artistic and design considerations, it may be advantageous if the axes of rotation of the rotary actuators include an angle of more than 0° and approximately in the range of 30°. It makes the engineering easier if they intersect.

The smallest adjustment effort, i.e. the most convenient and ergonomically sound solution, is achieved when, selectively and independently of the current relative position of the rotary actuator, only two or three fingertips at a time need to be placed from the same direction of access on one or two rotationally symmetrical outside envelope surfaces, which are then rotatable by the fingertips without any movement of hand or arm. The switchover then also takes place without hand or arm movement by a small displacement of the fingertips, either from outer envelope surface to outer envelope surface or with the outer envelope surface.

From the ergonomic point of view, the outflow volume adjustment should have higher access priority, that is, it should be reached automatically or "blind". This means that the rotational control variable for adjusting the outflow volume from the direction of access is adjustable more directly, hence more simply and easily. This is achieved by constructing the required torque for setting the outflow volume lower or at least not substantially higher than that of the rotational control variable to set the temperature, by ensuring that a switchable rotary actuator is coupled as a default pre-setting with the rotational control variable to adjust the outflow volume or, if there are two rotary actuators, that the one for adjusting the outflow volume is accessed first.

In an embodiment as a single mixing faucet, the metering and mixing function is realized with a double perforated plate valve as a mixing valve, whereby its two actuation quantities are each adjustable with one rotational control variable virtually independently of the other. The temperature of the outflow is manually adjustable via a rotational control variable as a ratio of the two flows with different temperatures entering the mixing valve through the inlet holes.

In an embodiment of the invention as a single-handed thermostat, a two perforated plate valve is a closing valve having a common angle of rotation of 65 to 90° as the actuation quantity for the outflow. The outflow temperature is controlled according to the rotational temperature control variable as a set value for the temperature by a thermostatic element in a thermostat valve as the mixing valve.

Prior art thermostatic mixer are constructed with coaxial rotary actuators with to the same direction of access, having an internal housing and a housing, whereby the rotary actuator for the temperature set point is mounted inside the internal housing. The said housing transmits the rotational control variable for flow quantity from the annular rotary actuator arranged behind the end-facing rotary actuator for the temperature to the perforated plate valve. This neither meets the ergonomic priority of volume adjustment, nor does it offer independent control movements.

Ergonomically correct handling can be achieved when the internal housing and the housing partially interpenetrate each other. The housing is divided in into an outermost and innermost part, in which the axis of rotation of the rotational temperature control variable is mounted in a fixed position. The internal housing is arranged between these parts and provided with openings, through which the struts on the innermost part, which are open to the outermost part, reach until they are in supporting contact, centering the housing. The width of the struts, the size of the openings and the number of both on the circumference are co-ordinated such that the internal housing is rotatable against the two-part housing by the maximum angle of rotation of the perforated plate valve.

In an embodiment of the mixing faucet of the invention with a second uniaxial rotary actuator for the second rotational control variable, direct access is created to each rotational control variable. In this way, the two rotational control variables can be set directly and clearly, each with an easily controllable single-axis rotation and without any additional effort that would impede the action or detract from its plausibility.

For single-handed operation, the axis of rotation of the second rotary actuator should run closely, preferably parallel to the axis of rotation of the first rotary actuator. The closer the rotary actuators are arranged to a direction of access, the more convenient the single-handed operation will be. If their axes of rotation are identical, the two rotary actuators can be operated in only one action of one hand. If they are arranged directly behind one another, the fingertips will be moved only slightly by about 2 cms substantially in the direction of its axis of rotation, to switch to the desired rotary actuator and thus to switch the rotational movement of the fingers to one of the two rotational control variables. When access to the handle is from the end in the direction of the axis of rotation, the result is the ergonomically optimised structure. The rotary actuators form a substantially invariate rotational body to the adjustment movements.

The rotational actuation can be made more explicit and the adjustment force input reduced with a radial lever, although this is superfluous in the invention. It complicates the adjustment movement, especially with large but precise control angles, and does not allow true single handed operation with two rotary actuators. The direction of access changes with the current relative position, requiring recognition of the current relative position to enable co-ordination of the access movement with it before accessing the actuator and performing the adjustment action.

A switching gear in the form of a torque converter as embodied in the invention enables switching the rotation of the fingers on a rotary actuator to either of the two rotational control variables, for example via an interchangeable coupling. A rotary actuator with an additional degree of freedom for switching between the two rotational control variables has, by nature, a uniform direction of access and also an identical axis of rotation for both control movements. Said rotary actuator is directly accessible by the shortest route. The rotational control variables can be set unambiguously with a uniaxial rotation. However, only the first control variable is directly accessible and is a simple rotation if for instance a spring pre-sets and holds the rotary actuator in switching position for the first rotational control variable. The setting of the second rotational control variable requires a switchover before the rotation movement and a holding force during the rotation movement, the said holding force being superimposed on the adjusting force.

The simplest case for a switchover is a thrust movement in the direction of the axis of rotation—either by pushing or pulling. The thrust movement can either be orthogonal to the direction of the axis of rotation or a pivoting or tilting movement of the rotary actuator or a part of the mixing faucet.

Interchangeable couplings include friction or toothed radial, axial or bevel couplings. The advantage of friction couplings is the short working distance and the smooth coupling action in every relative rotational position of the rotational control variables. The advantage of toothed coupling is the lower holding force, which does not have to be the higher normal force that generates the adhesion/friction force, but only has to overcome the switch spring and assure torque transmission after the coupling action.

When applying the concept of the invention to a singlehanded thermostat, the angle of rotation of about 90° of the movable perforated plate can be transmitted by a planetary gear, which can be arranged entirely inside the rotary actuator, in the entrance via the land or ring gear to the rotational control variable at the sun gear. The said sun gear is connectable torsion-resistantly to the rotary actuator with an identical axis of rotation. The actuation quantity has a high torque, due to seals and seal grease, and at the same time a smaller angle of rotation. The said high torque can be converted with a more than threefold transmission ratio into an ergonomically convenient adjustment movement.

A simple, reliable valve for the two functions of mixing and metering is the double ceramic perforated plate mixing valve, of which at least the first actuation quantity is a displacement of a first movable perforated plate of the perforated plate valve having in particular one hole, in relation to a second perforated plate arranged with a surface in surface contact with said first perforated plate, the second perforated plate being fixed in the housing and having two inlet bores and in particular one outlet bore.

A second actuation quantity can be, in particular, a degree of freedom of a third perforated plate of the perforated plate valve arranged movably in relation to the first perforated plate with its contact surface in surface contact and/or second perforated plate preferably as a mixing valve It is simpler to utilize two degrees of freedom of the first perforated plate independent of one another in relation to the second perforated plate for the two actuation quantities of the perforated plate valve especially as the mixing valve. To this end, a rotation or a second displacement orthoganol to the first displacement can be used as the second degree of freedom, whereby the outflow volume is not changed by adjusting the temperature, and vice versa. The target variables temperature and outflow volume can thus be set clearly and independently of each other. There is surface contact by means in particular of grease between the movable first perforated plate with one hole and the second perforated plate fixed in the housing and having two inlet holes and one outlet hole in its contact area.

In principle, the control element and the movable perforated plate may be identical. It is recommendable for reasons of engineering design, however, to transfer the actuation quantities to the perforated plate via a control element in direct supporting contact with the movable perforated plate.

Alternatively, the second actuation quantity can be selected as a degree of freedom of a third movable perforated plate.

A second actuation quantity of a valve controller can be converted into the second rotational control variable either by an additional degree of freedom of the first torque converter or by a separate second torque converter.

With a rotatory degree of freedom, the said second actuation quantity can be utilised directly as a rotational control variable. Both are then identical and can be the rotation of the second rotary actuator at the same time.

A very elegant solution for a suitable flat torque converter is a cam plate gear made up of a ring-shaped spirally grooved cam disc and a slider. The motion link of the said slider is guided in the helical groove. It is advantageous to arrange the center of the helix on the axis of rotation of the helical groove disc. The slider carries a tappet that engages in a groove of the controller, the length of which corresponds to its width and the displacement of the other degree of freedom. The perforation enables the passage of the dog of a second slider and/or the rotatable mounting of the cam disc on a shaft with an outside diameter corresponding to the diameter of the hole. Here, too, kinematic inversion is possible, of course, wherein the guide to groove is replaced by a guide rib on the cam disc and the motion link is replaced by a slider.

The simplest, most symmetrical and most compact design is given when the axes of rotation of at least one rotational control variable and at least the associated cam disc are identical or when even also the axis of rotation of the rotary actuator is identical. Then the rotary actuator and the cam disc can be rotatably mounted on a shared shaft, preferably the neck of a cartridge, both being connected to one another in particular torsion-resistantly, and executed preferably in one piece. If the axes of rotation of the two rotational control variables, the two cam discs and the two rotary actuators are identical, they can all be mounted on a single fixed shaft without frictional contact between the two rotational control variables.

A cartridge connects the valve and the torque converter to form a module. It reduces noise emission via the atmosphere and gives all the valve and gear members guidance and support. In this way, a slider can be mounted slidably in a groove of the cartridge and a cam disc with a perforation or port can be rotatably mounted on a shaft of the cartridge or with a shaft or its outer edge in a bore of the cartridge or also on the inner side of the circular cartridge envelope. The cartridge also serves to facilitate assembly when the valve or the torque converter is replaced.

With a second gear, especially a flat torque converter, the second actuation quantity of the perforated plate valve as the mixing valve or of a second valve, is convertible to the second rotational control variable. When using two, especially flat torque converters for the two degrees of freedom of the movable perforated plate, it is advantageous to arrange the torque converter gears in surface contact above each other, on condition that one torque converter has a fixed aperture such as, for example, a perforation concentric with the axis of rotation of the cam disc in a cam disc gear, to carry the transmission from the other gear through it.

In the case of cam disc gears with grooved discs, the grooved disc and slider can each be layered above each other alternately like blocks. They guide and support each other reciprocally. This results in the most compact, stable and, if the axes of rotation of the cam discs are identical, the simplest structural principle, wherein large parts of the torque converter can be accommodated inside the rotary actuator.

If at least one, and especially all of the rotary actuators preferably having a direction of access from the front, is/are invariate in its/their external form to its/their respective degree of freedom, they can be grasped with the fingers and adjusted in any position without prior orientation. With two successively arranged rotary actuators with the same axis of rotation, the switch from one to the other is possible in any relative rotary position without any correction of position of the fingers, making handling genuinely most convenient.

The invention also allows for the rotary actuator(s) to be electrically driven. The angle of rotation can be set by a manual adjuster, more particularly operated by at least one finger, preferably by means of an incremental rotary position transducer.

The mixing faucet of the invention enables mixing in the quasi widened pipe, i.e. in a purely rotationally symmetrical external shape, wherein the outflow can be carried through the torque converter(s) and preferably the rotary actuator(s), particularly through the passage, which is preferably formed by a centrally perforated cam disc.

To this end, the mixing valve, perforated plate valve, rotary actuator and in particular the torque converter can define a cavity open at opposite ends, preferably and partially formed by a cartridge, which positions the mixing valve, perforated plate valve, rotary actuator and torque converter especially in relation to each other.

The cavity preferably extends in particular along the central axis of the housing from the inlet holes to the outlet of the outflow, and/or the mixing valve, perforated plate valve, rotary actuator and in particular the torque converter are formed as concentric rings.

A channel for the outflow, connecting the mixing valve and the outlet, can lead through at least part of the cavity, said channel being formed at least in part more particularly by a central pipe leading out of the housing.

If the rotary actuator(s) and in particular the housing are formed in a rotationally symmetrical manner, with its/their central axi(e)s preferably in alignment with the central axis of the central pipe, a generally uniform rotationally symmetrical outer shape can be created as the simplest embodiment.

The simplest embodiment of a mixing valve as a robust ceramic threefold perforated plate valve can be achieved by means of a third perforated plate in surface contact with the movable first perforated plate, both of them being formed with in particular one hole each, of which one is larger than the other about the control paths and both of them opening into each other and into the channel connecting the mixing valve and the outlet for the outflow Further features and advantages of the invention will be apparent from the claims and the following description of the drawings, in which three embodiments of the invention are visualised diagrammatically.

DESCRIPTION OF PREFERRED EMBODIMENTS

Figure 1:
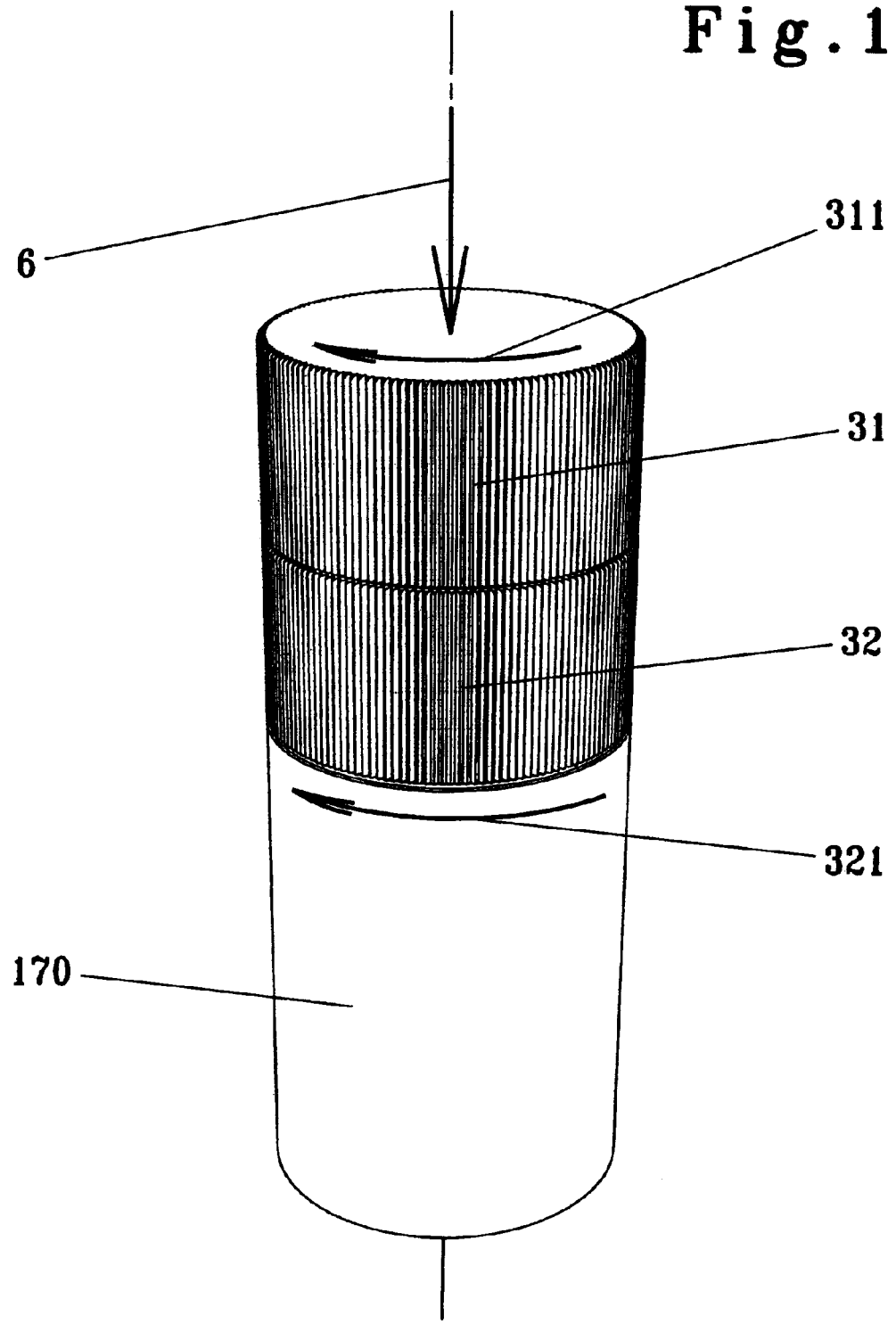
FIG. 1 shows in a perspective drawing a mixing faucet according to the invention, in which for the sake of simplicity the usual outflow arm and the inlet connections are not shown.

In FIG. 1 the mixing faucet is shown in the usual external view. The two cylindrical rotary actuators 31, 32, which are invariate in relation to their adjusting movements, and each having a uniaxial rotatory degree of freedom 311, 321, are arranged, directly above one another. The access direction 6 is the same and constant across the entire range of adjustment. The external envelope surfaces are gnurled in order to guarantee a secure friction engagement even with soapy fingers. Their axes of rotation are identical with the center axis of the housing 170, which is also cylindrical. This upright arrangement corresponds to the use of the mixing faucet in sinks or wash basins. The hand comes from the end and above parallel to the axes of rotation to grasp it. The ergonomically advantageous length of the housing 170 beneath the two rotary actuators 31, 32 is between 45 and 200 mm.

The preferable external diameter of the two rotary actuators 31, 32 is between 25 and 50 mm. If the external diameter of the housing 170 corresponds to those of the rotary actuators 31, 32, they will be between 40 and 50 mm. Their height is preferably between 15 and 40 mm each, depending on the respective diameter, in order to enable reliable operation by a single hand in one action.

When using the mixing faucet for showers or bathtubs, the mixing faucet is arranged rotated by 90° in horizontal position, so that the two rotary actuators 31, 32 point forward towards the user. The housing length behind the rotary actuators 31, 32 is then approximately 65 mm.

Figure 2:
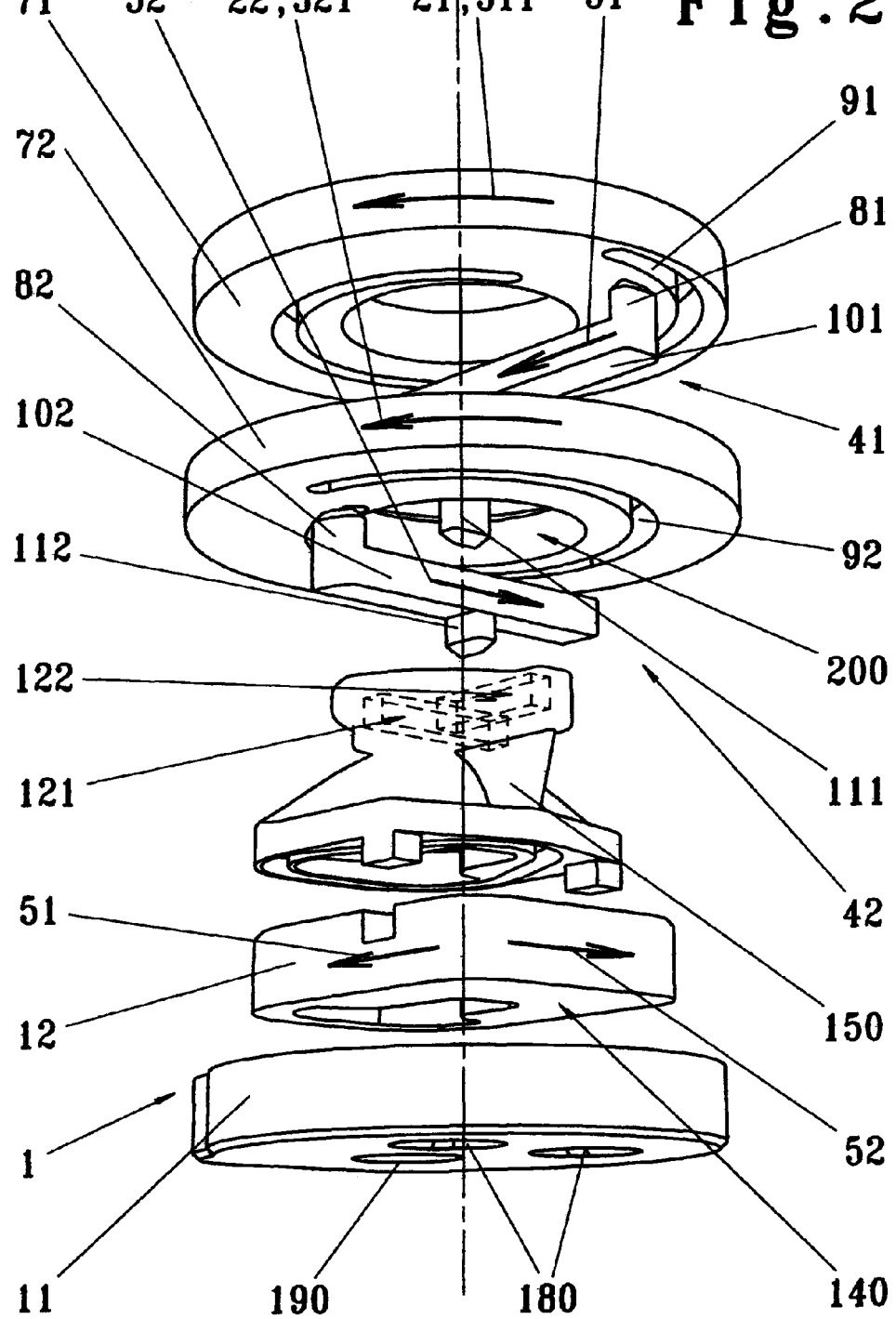
FIG. 2 shows another perspective diagram of the same embodiment, in which, for the sake of easier visibility, only the valve and the torque converter are exploded vertically and shown spaced from one another by 5 mm each, leaving out the rotary actuator, the cartridge and the housing.

The bottom part of FIG. 2 shows a perforated plate mixing valve 1, consisting of a first perforated plate 11, fixed in the housing (not shown), having one inlet hole 180 each for hot and cold water and an outlet hole 190 for the mixed water, and a to second performated disc 12, arranged in surface contact in a contact area 140 with it, being displaceable in relation to the said first perforated plate in two orthogonally translatory degrees of freedom as actuation quantities 51, 52, the said second perforated plate 12 being connected to the control element 150 in positive locking manner. This arrangement has the purpose firstly to deflect the incoming cold and hot water flows by 180° and secondly, it carries two control grooves 121, 122. The main direction of extension corresponds in each case to one of the two actuation quantities 51, 52 to receive the dogs 111, 112.

Above the control element 150 are two cam disc gears as flat torque converters 41, 42, layered en bloc in surface contact with each other. Their members mutually support and guide each other. Each of them has a slider 101, 102 arranged beneath an annular grooved disc as the cam disc 71, 72, each with one single-axis rotatory degree of freedom as the rotational control quantity 21, 22, which in this embodiment corresponds in each case to the degree of freedom 311, 321 of the rotary actuator 31, 32, with which they are connected torsion resistantly. The said slider 101, 102 is guided with its motion link 81, 82 in the helical guiding groove 91, 92 on the underside of the grooved disc. The two cam disc gears convert the two displacements, which are orthogonal to one another and defined by the valve construction as actuation quantities 51, 52 of the perforated plate 12 into single-axis rotations of the cam discs 71, 72 with limited torque and a large actuating angle as the rotational control variables 21, 22. The axes of rotation of the two cam discs 71, 72 are identical, centric to their external envelope surface and normal to the contact surface 140 of the two perforated plates 11, 12.

The dog 111 of the upper torque converter projects through the passage 13 of the cam disc 72 of the lower torque converter 42 into the control groove 122 of the control unit 150. The passage 13 is a circular centric hole concentric with the axis of rotation of the cam disc that allows sufficient play for the displacement of the actuation quantity 51 of the upper slider 101 and is in fixed position, as its central axis is identical with the axis of rotation of the lower cam disc 72.

Figure 3:
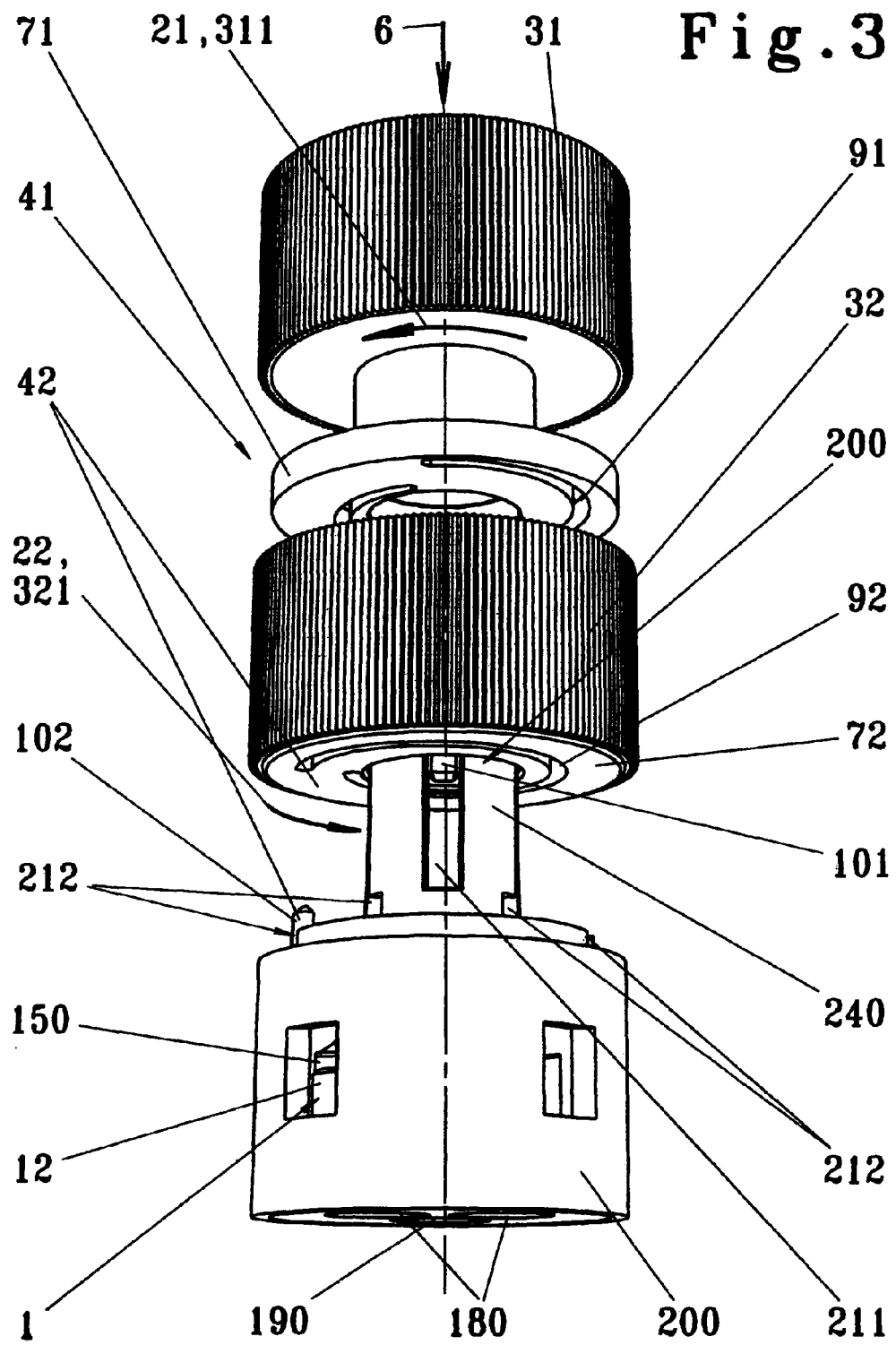
FIG. 3 shows another perspective illustration of the same embodiment, in which one rotary actuator with the associated cam disc is vertically exploded by 20 mm in each case in relation to the adjacent part, leaving out the housing.

FIG. 3 discloses the interconnection between the two rotary actuators 31, 32 to with the same direction of axis 6 and the two torque converters 41, 42 and shows the fixed cartridge 200, which defines the relative positions of all the members of the torque converters 41, 42 and the first perforated plate (not shown) of the perforated mixing valve 1. The said mixing valve is defined in the housing (not shown) and has two inlet holes 180 in its base for the hot and cold inflows, and an outlet hole 190 for the mixed outflow.

The bottom part is an almost closed cylinder enclosing the perforated plate mixing valve 1 and the control element 150. The upper closure of this cylinder has a groove 212 to receive and guide the slider 102 of the lower torque converter 42 in the direction of its sliding movement as actuation quantity 52.

Further up, the cartridge 200 continues into a neck with a circular ring-shaped cross section, which is interrupted by another groove 211 to receive and guide the slider 101 of the upper torque converter 41 in the direction of its displacement as actuation quantity 51. The neck forms a common shaft 220, on which the two cam discs 71, 72, and hence the two associated torsion-resistantly connected rotary actuators 31, 32, are rotatably mounted in pairs in their degrees of freedom 311, 312. In this way, the axes of rotation of the two rotary actuators 31, 32 and the two cam discs 71, 72, hence the rotational control variables 21, 22 are identical. The degrees of freedom 311, 312 of the rotary actuators 31, 32 are also those of the cam discs 71, 72 as rotational control variables 21, 22 and identical in this embodiment.

Because of the uniform rotational symmetry about the vertical center axis as the single, shared axis of rotation, the entire torque converter 41 and a large part of the torque converter 42 can be accommodated simply inside the rotary actuator 32 in a mutually guiding and stabilising manner.

Figure 4:
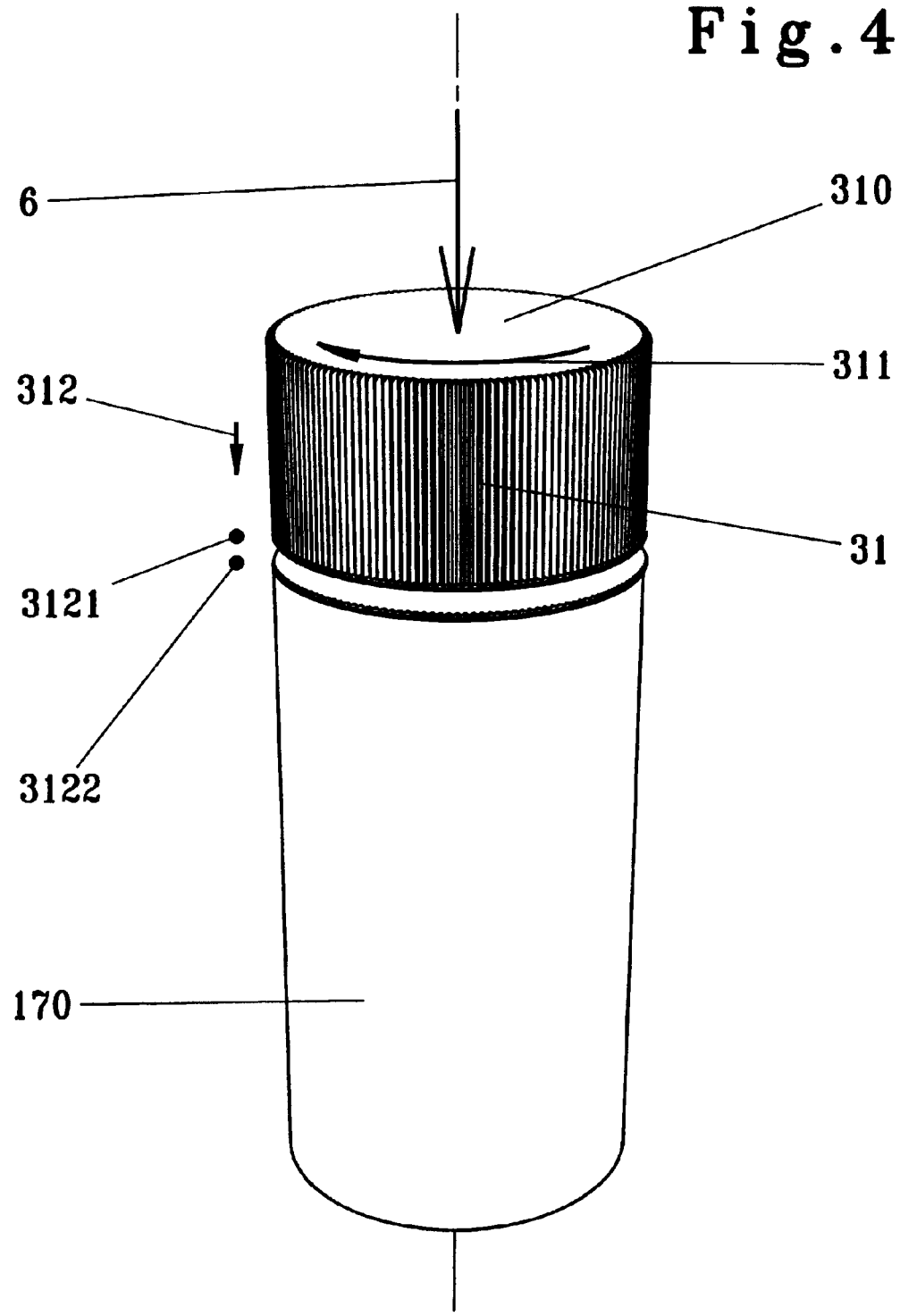
FIG. 4 a perspective view of a second embodiment of a mixing faucet according to the invention, in which the usual outflow arm and the inlet connections are not shown.
Figure 5:
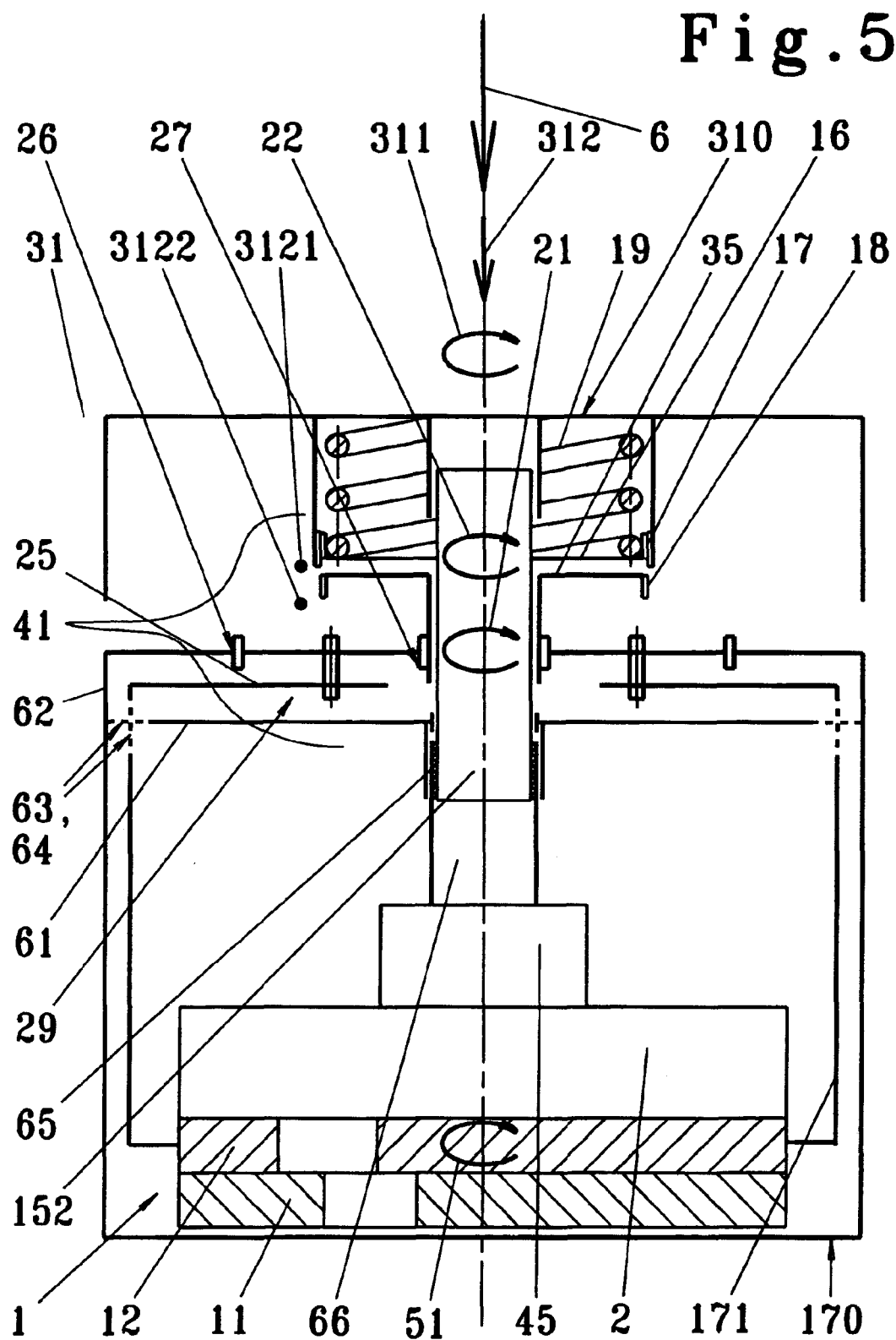
FIG. 5 shows a diagrammatic cross-section of the actuating mechanism of the simplified second embodiment of a mixing faucet according to the invention, in which thermostat valve is shown with thermostatic element only as a black box, openings to and struts that penetrate them are represented by the bold dotted lines, and the outflow arm and connections are omitted.

In the embodiment of FIGS. 4 and 5, the mixing faucet is a true single-handed thermostatic mixer with thermostat valve 2 as the mixing valve to control the actuation quantity for the mixing ratio of the inflows, which determines the temperature of the outflow according to a set point specified by the rotational control variable 22 and perforated plate valve 1, to control the actuation quantity 51 for the size of the outflow as a closing valve actuated by rotational control variable 21.

With a switching gear as the torque converter 41, the two rotational control variables 21, 22 can be actuated from a permanent direction of access 6 with one action of one hand by means of only one uniaxial rotary actuator 31. An additional translatory degree of freedom 312 in the direction of the axis of rotation of its first rotational degree of freedom 311 allows the addition of a radial shift gear 17, 18. Depending on its final position 3121, 3122 in its degree of freedom 312 during the rotation of its degree of freedom 311, the said shift gear 17, 18 either couples the said additional degree of freedom 312 with the movable perforated plate 12 of the perforated plate valve 1 via the hollow shaft 35, planetary gear 29 and the internal housing 171, or with the actuator of the thermostatic control element 45 of the thermostatic valve 2, via the crown gear 16, axis 152, screw thread 65 and thrust sleeve 66, as a result of which its rotatory degree of freedom 311 corresponds to one or the other rotational control variable 21, 22.

Internal housing 171 and housing 170 interpenetrate each other by means of openings 64 and struts 63 passing through the said openings. To this end, the housing 170 is divided into an outermost, closed portion 62 and an innermost portion with openings 61 forming struts 63 for supporting contact, the said struts 63 being open to the outermost portion 62. The two portions 61, 62, are torsion-resistantly and releasably connected. The axis 152 for the rotational control variable 22 and the thrust sleeve 66 are mounted in the innermost portion 61. The internal housing 171 is arranged between these portions 61, 62 and provided with openings 64, through which the struts 63 of the innermost portion 61 of the housing 170 grasp outwards far enough to center and support the outermost portion 62. The width of the struts 63 and the size of the openings 64 are co-ordinated such that the internal housing 171 can be twisted in relation to the two-part housing 170 by the maximum actuation quantity 51 as the angle of rotation of the movable perforated plate 12 of the perforated plate valve 1 of about 65 to 80°.

Actuation quantity 51 is defined via the internal housing 171 for turning the planet gear carrier 25. The ring gear 26 is fixed in the outermost part 62 of the housing. The resulting rotation of the sun gear 27 with limited torque and enlarged angle of rotation of preferably more than 250° forms the rotational control variable 21. The transmission ratio is preferably 1.6 to 4, more particularly via 2. Interchangeable coupling 17, 18, and the planetary gear 29 together form the switching gear as the torque converter 41.

Figure 6A:
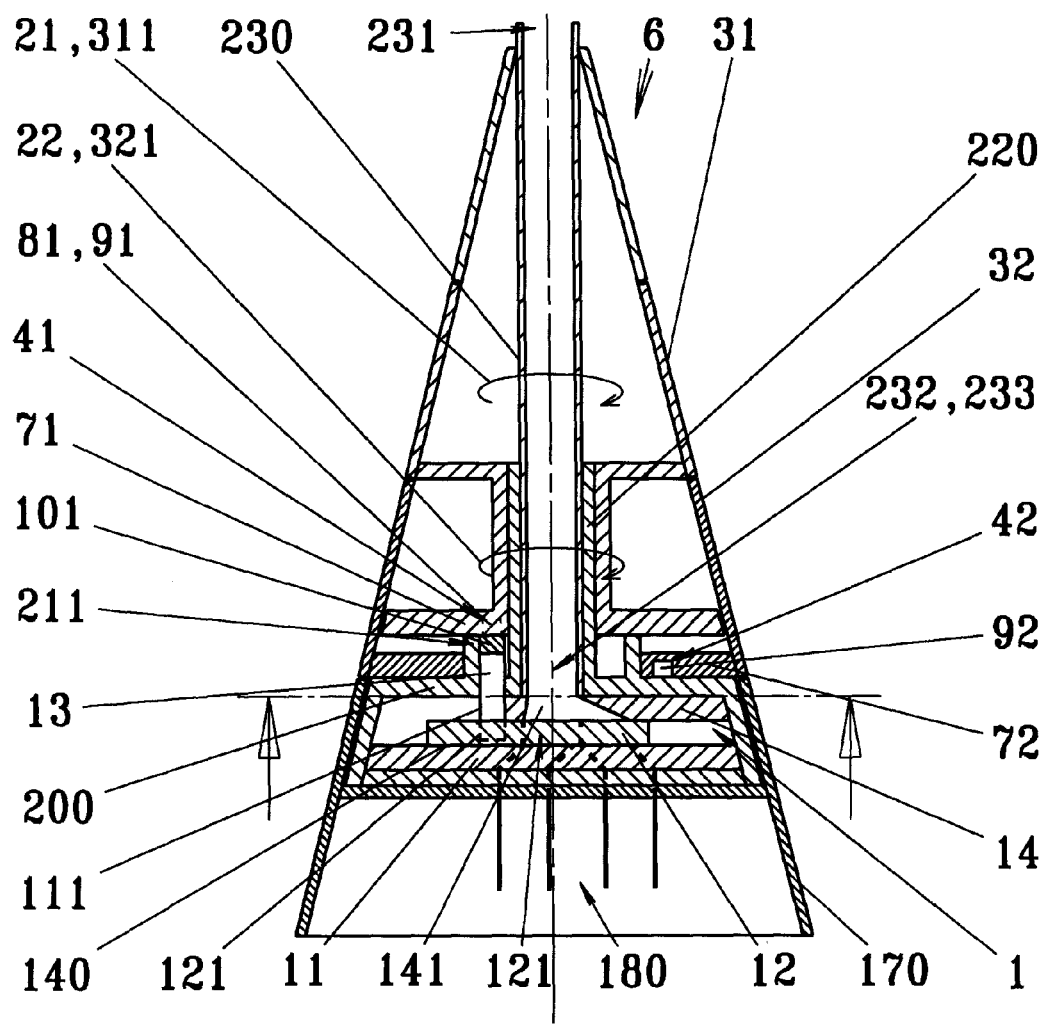
FIG. 6a and FIG. 6b show two sections orthogonally placed to each other in a third embodiment of the mixing faucet of the invention, in which the contact cross sections of holes are projected as a phantom.
Figure 6B:
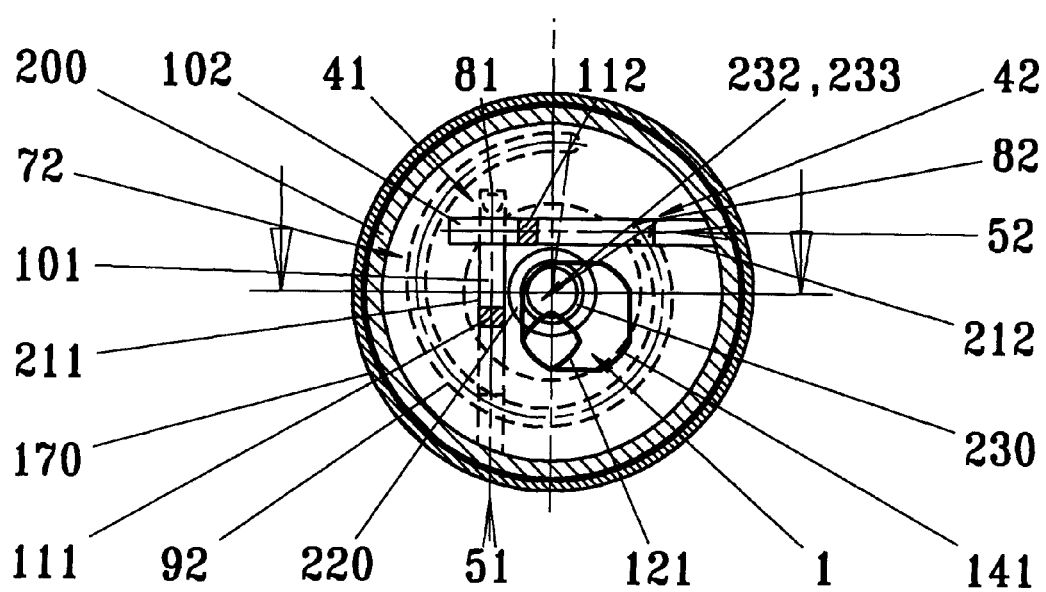

The interchangeable coupling 17, 18 is held in its end position 3121 by means of a spring 19 as the pre-setting, so that the adjustment of the rotational control variable 21 is always possible in a direct, sure and practically "blind" manner without any additional coupling action. This conforms to the ergonomic priority for the adjustment of the outflow volume, which determines the start and finish of drawing water. To switch to end position 3121 and thus to rotational control variable 22, the spring force must be overcome by a compression force in the direction of access 6 to maintain the setting for the entire duration of adjustment. This can be achieved by the upper end surface 310 of the rotary actuator 31 impacting the cupped hand as it grasps in the direction of access, the height of the rotary actuator being selected to be greater than the depth of the cupped hand, or by a secure friction bond between the adjusting fingertips and the outer envelope surface of the rotary actuator 31, e.g. by circumferential gnurling The third embodiment of a mixing faucet of the invention according to FIG. 6a and FIG. 6b is also a genuine one-hand mixer. The two conical rotary actuators 31, 32 are invariate in relation to their adjustment movements, each having a uniaxial rotary degree of freedom 311, 321. The said rotary actuators 31, 32 are arranged directly on top of each other. Their direction of access 6 is the same, constant across the entire range of adjustment, and almost at the end of the rotary actuator 31 in a very small angle of the central axis of the whole rotary body. This is formed jointly by the housing 170, rotary actuators 31, 32 and the central pipe 230 opening into the outlet 231 (shown shortened) to a "widened pipe". The central axis shared by all of them is also the axis of rotation of the two rotary actuators 31, 32, through which either of the rotational control variables 21, 22 can be set from a hand position by finger movement only, by shifting the fingertips merely in the direction of the central axis from one rotary actuator 31, 32 to the other.

Each of the rotational control variables 21, 22 leads to a rotation of a cam disc to 71, 72 with the helical guide groove 91, 92, in which runs the motion link 81, 82 of a slider 101, 102. The said slider 101, 102 is in surface contact with the cam disc 71, 72 and is guided in a straight linear groove 211, 212 of the cartridge. This enables any rotational control variable 21, 22 to be converted into one of two translatory actuation quantities 51, 52 of the movable perforated plate 12 that are orthogonal to each other and hence independent of each other.

The two flows coming in through the inlet holes 180 are mixed in the mixing valve 1 with three perforated plates and guided in the same direction out of the housing 170 to the outlet 231 via the central pipe 230 arranged in the cavity 232 defined by the perforated plate valve 1, annular torque converters 41, 42 and annular rotary actuators 31, 32, the said cavity being partly limited by a neck 220 of the cartridge 200.

The actuation quantity 52 causes a displacement of the hole 121 in relation to the two holes of the inlet bores 180, thereby adjusting the ratio of the inflows, hence the temperature of the outflowing mixed flow. The actuation quantity 51 also causes a shift of hole 121 in relation to the two inlet holes 180, although the two holes are more or less closed to the same degree. Thus, the volume of the mixed outflow is adjusted. Perforated plate 14 has a larger hole 141 than hole 121, so that the displacements are balanced out again and the mixed flow always flows into the central pipe 230.

The cartridge 200 positions all parts in relation to one another and is closed on its underside with a bottom. It is supported by an intermediate floor of the housing 170. This upright arrangement corresponds to the use of the mixing faucet on sinks or wash basins. It can also be used in a horizontally or obliquely in relation to the wall tap.

Accordingly, other embodiments and modifications are conceivable and feasible within the scope of the claims. The object of the invention is not limited to the embodiments shown in the drawings and described above.

What is claimed is:

1. A mixing faucet for two liquids at different temperatures, the mixing faucet comprising:
   a mixing valve,
   a perforated plate valve having at least one actuation quantity that alone determines a volume of an outflow of the two liquids;
   a first rotary actuator mounted in a fixed housing so as to be rotatable in one rotational degree of freedom relative to the fixed housing, wherein a rotation of the first rotary actuator provides adjustment of at least one of two independent coaxial rotational control variables for controlling volume or temperature of the outflow, wherein the at least one of the two rotational control variables is selectable by two fingertips placeable on approximately opposite sides of an outer envelope surface of the first rotary actuator and wherein the at least one of the two rotational control variables is selectively adjustable by one hand that remains in a permanent position in the direction of access over the entire range of adjustment,
   a first planar multi-link conversion gear that comprises conversion gear elements and conversion gear links, wherein the conversion gear links each connect two of the conversion gear elements to each other with at least one degree of freedom;
   wherein the first planar multi-link conversion gear is of substantially rotational symmetry relative to a drive axis thereof, wherein the drive axis is an axis of rotation of the one of the two rotational control variables;
   wherein the first rotary actuator is operatively connected to the first planar multi-link conversion gear and the conversion gear elements all move relative to each other when the first planar multi-link conversion gear is acted on by the first rotary actuator;
   wherein, when the first rotary actuator is adjusted, the first planar multi-link conversion gear converts the at least one of the two rotational control variables to the at least one actuation quantity on a plane that is parallel to a slip plane of the perforated plate valve.

2. The mixing faucet according to claim 1, wherein the at least one of the two rotational control variables is adjusted with a limited torque, wherein the at least one of the two rotational control variables is reduced to the at least one actuation quantity by the first planar multi-link conversion gear.

3. The mixing faucet according to claim 2, wherein the first planar multi-link conversion gear has overall a shape of substantially a circular plate.

4. The mixing faucet according to claim 1, in the form of a single-hand mixer, wherein either one of the two rotational control variables is adjustable selectively in a substantially single hand position by access of one hand in a permanent direction of access.

5. The mixing faucet according to claim 1, wherein a first one of the two rotational control variables for setting the volume of the outflow is adjustable, in the direction of access, more directly with a not substantially larger torque than a second one of the two rotational control variables for adjusting the temperature, wherein adjustment is done via the first rotary actuator positioned in an end position.

6. The mixing faucet according to claim 1, wherein the perforated plate valve has two inlet holes and wherein an inflow ratio of the two liquids entering the perforated plate valve is adjustable by hand by one of the two rotational control variables.

7. The mixing faucet according to claim 1, wherein the mixing valve comprises a thermostatic element wherein a temperature of the outflow is controlled by one of the two rotational control variables as a set point and wherein the perforated plate valve acts as a closing valve.

8. The mixing faucet according to claim 7, further comprising an inner housing arranged in the fixed housing, wherein the fixed housing and the inner housing partially interpenetrate each other by struts and openings formed thereon, respectively, and wherein the fixed housing is of a two-part structure comprising an innermost portion and an outermost portion, between which at least one portion of the inner housing is arranged.

9. The mixing faucet according to claim 1, comprising a second rotary actuator mounted in the fixed housing so as to be rotatable in one rotational degree of freedom relative to the fixed housing, wherein the second rotary actuator is substantially of rotational symmetry relative to an axis of rotation thereof and has a same direction of access as the first rotary actuator, wherein the second rotary actuator adjusts one of the two rotational control variables by rotation in said one rotational degree of freedom.

10. The mixing faucet according to claim 9, wherein the first and second rotary actuators are arranged behind one another on the axes of rotation, wherein the direction of access coincides with the axis of rotation so that the adjusting movement of the fingertips takes place substantially in the direction of the axes of rotation.

11. The mixing faucet according to claim 9, wherein an adjustment movement of fingertips of an accessing hand is selectively switchable to one of the two rotational control variables in almost any of the relative rotational positions of the first and second rotary actuators by displacement of the fingertips from one of the first and second rotary actuators to the other one.

12. The mixing faucet according to claim 1, wherein the first planar conversion gear is a switching gear with an interchangeable coupling through which the rotation of the first rotary actuator, by axial displacement of the first rotary actuator, is selectively switchable to one of the two rotational control variables.

13. The mixing faucet according to claim 1, wherein the first planar conversion gear is a planetary gear arranged at least largely inside the first rotary actuator, wherein the planetary gear comprises a sun gear that is connectable fixedly to the first rotary actuator having an axis of rotation identical to the axis of rotation of the sun gear.

14. The mixing faucet according to claim 1, comprising a second planar multi-link conversion gear with which a second one of the two rotational control variables is converted to a second one of the at least one actuation quantity of the perforated plate valve or of a second valve of the mixing.

15. The mixing faucet according to claim 1, wherein the first planar multi-link conversion gear is a cam disc gear comprising a cam disc.

16. The mixing faucet according to claim 15, wherein the axis of rotation of the at least one of the rotational control variables and the axis of rotation of the cam disc are identical.

17. The mixing faucet according to claim 15, comprising a second planar multi-link conversion gear, wherein the first and second planar multi-link conversion gears are arranged in surface contact on top of each other, wherein the second planar multi-link conversion gear leaves open a fixed opening that is fixed within the fixed housing for transmission of forces from the first planar multi-link conversion gear.

18. The mixing faucet according to claim 17, wherein the second planar multi-link conversion comprises a cam disc, wherein the first and second planar multi-link conversion gears each further comprise a slider disposed on and interacting with the cam disc so as to slide relative to the cam disc, wherein the cam discs and the sliders of the first and second planar multi-link conversion gears are arranged alternatingly on top of each other with identical axes of rotation of the cam discs.

19. The mixing faucet according to claim 15, wherein the cam disc gear comprises a slider that is guided with a motion link in a guide groove of the cam disk, wherein the slider is mounted slidably in the mixing faucet so as to slide in a direction of displacement as the at least one actuation quantity.

20. The mixing faucet according to claim 19, wherein the guide groove has the shape of a helix.

21. The mixing faucet according to claim 19, wherein the first rotary actuator and the cam disc are rotatably mounted on a common shaft that is the neck of the cartridge.

22. The mixing faucet according to claim 19, wherein the slider engages with a dog a control groove of a control element that is supported on a movable perforated plate of the perforated plate valve.

23. The mixing faucet according to claim 1, wherein the first rotary actuator has a direction of access from an end face and has substantially an invariant external form with respect to said one rotational degree of freedom.

24. The mixing faucet according to claim 1, wherein the outflow volume passes through the first planar conversion gear.

25. The mixing faucet according to claim 24, wherein a passage that is fixed within the fixed housing is formed through the first planar conversion gear.

26. The mixing faucet according to claim 1, wherein the perforated plate valve comprises a moveable first perforated plate, a second perforated plate and a third perforated plate, wherein the third perforated plate is in surface contact with the movable first perforated plate, wherein the first and third perforated plates each have at least one hole communicating with each other, wherein the holes open into a channel connecting the mixing valve and an outlet for the outflow.

27. The mixing faucet according to claim 1, further comprising a second rotary actuator with one rotational degree of freedom, wherein the first rotary actuator and the second rotary actuator have a direction of access from an end face and have substantially an invariant external form with respect to said rotational degree of freedom, respectively.

28. The mixing faucet according to claim 1, wherein the first planar multi-link conversion gear converts a first type of movement of the at least one of the two rotational control variables into a second type of movement, wherein the first type of movement is different from the second type of movement.

29. The mixing faucet according to claim 1, wherein the first planar multi-link conversion gear converts a first magnitude of movement of the at least one of the two rotational control variables to a second magnitude of movement of the at least one actuation quantity, wherein the first magnitude of movement is greater than the second magnitude of movement.

* * * * *